Sept. 28, 1937.　　　　J. BENAMY　　　　2,094,520

RECEPTACLE WITH TEMPERATURE INDICATOR

Original Filed Nov. 23, 1935

Inventor

Joseph Benamy

By　*Clarence A. O'Brien*

Attorney

Patented Sept. 28, 1937

2,094,520

UNITED STATES PATENT OFFICE 2,094,520

RECEPTACLE WITH TEMPERATURE INDICATOR

Joseph Benamy, Atlanta, Ga.

Application November 23, 1935, Serial No. 51,323
Renewed August 12, 1937

1 Claim. (Cl. 73—343)

This invention relates broadly to receptacles and more particularly to a receptacle having as a unitary part thereof a thermometer whereby the temperature of the contents of the receptacle may be readily ascertained.

The present invention contemplates the provision of receptacles, such as nursing bottles and any and other of all types of liquid containers with a thermometer whereby the temperature of the liquid contents of the container may be readily ascertained.

Figure 1:
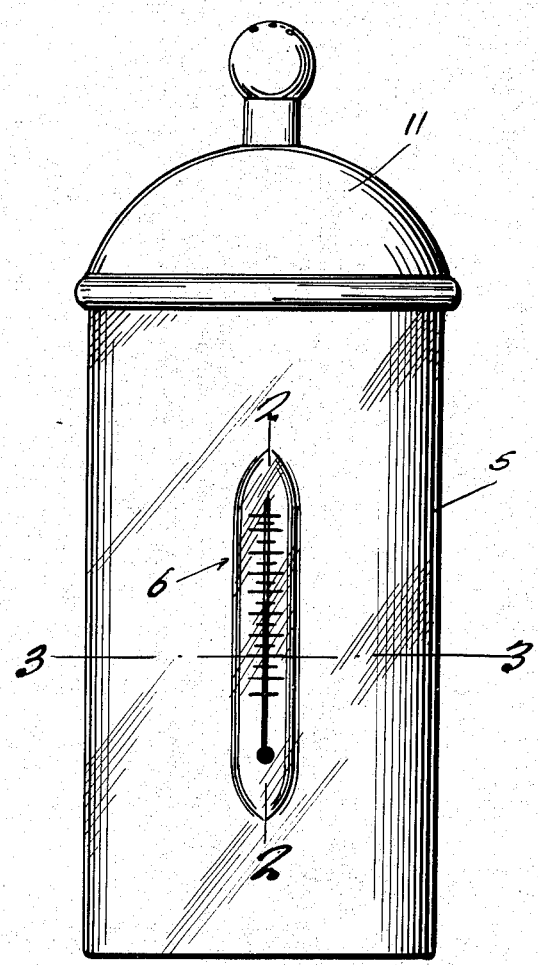
Figure 2:
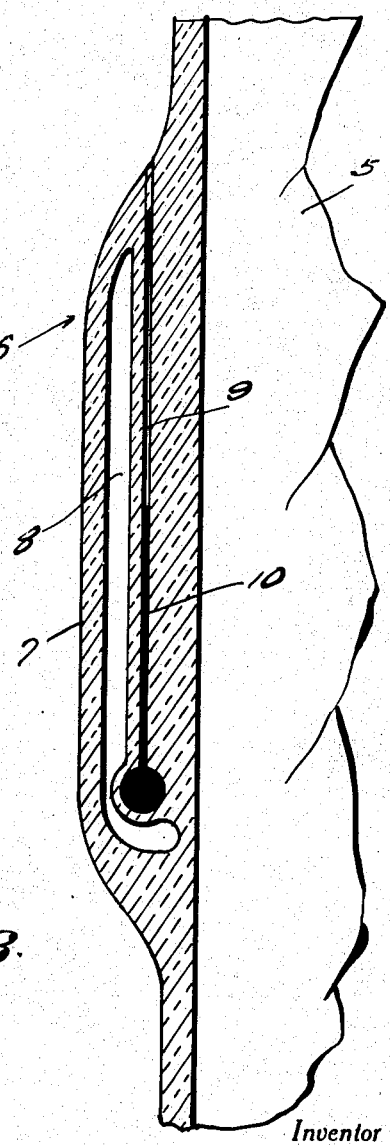
Figure 3:
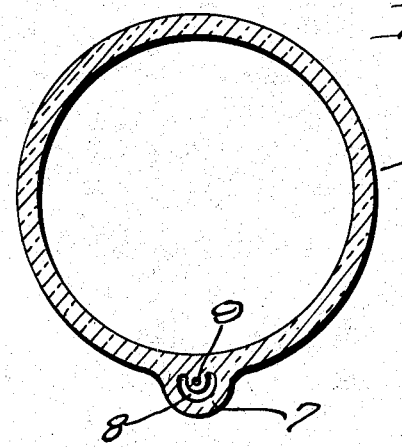

The invention together with its objects and advantages will be best understood from a study of the following description taken in connection with the accompanying drawing wherein:

Figure 1 is an elevational view illustrating the application of the invention to a nursing bottle, and Figures 2 and 3 are detail views taken substantially on the lines 2—2 and 3—3 respectively of Figure 1.

Referring to the drawing by reference numerals it will be seen that in the preferred embodiment thereof the receptacle indicated generally by the reference numeral 5 has formed integrally and on the peripheral wall thereof a thermometer indicated generally by the reference numeral 6. The thermometer 6 may be either of the Fahrenheit or centigrade type.

While the thermometer 6 may be associated with the receptacle 5 in any suitable or well known manner it will be seen that in the form illustrated the wall of the receptacle, in any well known manner is provided with a radially projecting longitudinally extending integrally formation 7 provided with an insulating or air chamber 8 and a chamber 9 for the mercury 10. By providing the air chamber 8 the mercury of the thermometer will not be affected by the variation of temperature changes externally of the receptacle 5 and consequently will indicate accurately the temperature of the contents of the receptacle. It will be understood of course that the chamber 9 for the mercury 10 is sealed in any suitable manner also proper graduations will be provided on the outer surface of the formation 7 and in proper relation to the mercury 10.

In the present instance I have illustrated the receptacle 5 as being in the form of a nursing bottle, the nipple being indicated generally by the reference numeral 11. It will be understood however that any receptacle of any character or for any purpose may be equipped with a thermometer in accordance with the teachings of the present invention.

Having thus described my invention, what I claim as new is:

A receptacle having a thermometer embedded in its wall and a closed air chamber in the wall and spaced outwardly from and partly surrounding the thermometer to insulate the thermometer from exterior temperatures, said thermometer being in direct contact with the wall of the receptacle inwardly of said air chamber.

JOSEPH BENAMY.